(12) United States Patent
Cardillo, Jr. et al.

(10) Patent No.: US 6,279,923 B1
(45) Date of Patent: Aug. 28, 2001

(54) PERSONAL WINTER VEHICLE

(76) Inventors: Anthony P. Cardillo, Jr., 20 Acacia Dr.; Jeffrey R. Cardillo, 16 Cannon Dr., both of Holbrook, NY (US) 11741; Thomas J. Barresi, 12 Equestrian Ct., Stony Brook, NY (US) 11790

( * ) Notice: Subject to any disclaimer, the term of this patent is extended or adjusted under 35 U.S.C. 154(b) by 0 days.

(21) Appl. No.: 09/518,485

(22) Filed: Mar. 3, 2000

Related U.S. Application Data

(63) Continuation-in-part of application No. 09/255,889, filed on Feb. 20, 1999, now abandoned.

(51) Int. Cl.$^7$ ................................ B62B 9/04; B62K 25/00
(52) U.S. Cl. ......................... 280/12.14; 280/284; 280/13
(58) Field of Search ........................ 280/12.14, 283, 280/284, 12.13, 12.12, 12.11, 12.1, 13, 285; 180/190, 193

(56) References Cited

U.S. PATENT DOCUMENTS

| | | |
|---|---|---|
| D. 266,917 | 11/1982 | Stewart et al. . |
| D. 267,000 | 11/1982 | Condon et al. . |
| 551,442 | 12/1895 | Korff . |
| 654,291 * | 7/1900 | Stith ................................ 280/12.14 |
| 2,475,250 * | 7/1949 | Petersen ............................ 280/12.14 |
| 2,633,365 | 3/1953 | Cwynar et al. . |
| 3,252,533 | 5/1966 | Aeder et al. . |
| 3,336,037 * | 8/1967 | Brozovich ........................ 280/12.14 |
| 3,336,994 * | 8/1967 | Pederson ............................ 280/12.14 |
| 3,441,285 | 4/1969 | Rogers . |
| 3,561,783 | 2/1971 | Ellett . |
| 3,610,356 | 10/1971 | Byar, Jr. . |
| 3,707,199 | 12/1972 | Gerich et al. . |
| 3,717,359 | 2/1973 | Peronnon . |
| 3,766,999 | 10/1973 | Berguis et al. . |
| 3,822,755 | 7/1974 | Hine . |
| 3,833,233 * | 9/1974 | Sugiyama ........................... 280/12.14 |
| 3,872,938 | 3/1975 | DeGroot . |
| 3,915,468 * | 10/1975 | Hoareau ............................ 280/12.14 |
| 3,960,387 * | 6/1976 | Nerio ................................ 280/12.14 |
| 4,027,891 | 6/1977 | Frame . |
| 4,059,168 | 11/1977 | House . |
| 4,109,739 | 8/1978 | Husted . |
| 4,146,101 | 3/1979 | Plourde . |
| 4,168,841 * | 9/1979 | Uhlyarik ........................... 280/12.14 |
| 4,204,581 | 5/1980 | Husted . |
| 4,206,828 | 6/1980 | Husted . |
| 4,244,436 | 1/1981 | Condon . |
| 4,286,682 | 9/1981 | Stewart . |
| 4,307,788 | 12/1981 | Shelton . |
| 4,421,193 | 12/1983 | Bissett . |
| 4,434,867 | 3/1984 | Grinde . |
| 4,437,534 | 3/1984 | Grinde . |

(List continued on next page.)

*Primary Examiner*—Lanna Mai
*Assistant Examiner*—Jeff Restifo
(74) *Attorney, Agent, or Firm*—Levisohn, Lerner, Berger & Langsam

(57) ABSTRACT

A personal winter vehicle has a frame which includes a front portion and a rear portion. Preferably, the front and rear portions of the frame can flex with respect to each other. An operator-controlled motivator for generating torque, such as a pedal crank, is mounted on the frame. A drive assembly is attached to the rear portion of the frame and is mechanically coupled to and receives torque from the motivator. The drive assembly preferably includes a drive wheel rotatably attached to the rear portion of the frame and coupled to the motivator via mechanical coupling, and a track disposed around part of the circumference of the drive wheel. The drive assembly also may include a guide wheel rotatably attached to the frame and disposed in front of the drive wheel. The track is also disposed around the guide wheel. The front of the vehicle may include a ski which is turnable by operation of handlebars. Alternatively, there may be provided a front wheel also having a track. Brakes are provided, preferably caliper brakes which retard the rotation of the drive wheel and, if provided, the front wheel.

50 Claims, 12 Drawing Sheets

U.S. PATENT DOCUMENTS

| | | |
|---|---|---|
| 4,442,913 | 4/1984 | Grinde . |
| 4,466,626 * | 8/1984 | Leritz ................................ 280/12.14 |
| 4,488,616 | 12/1984 | Harris . |
| 4,502,560 | 3/1985 | Hisatomi . |
| 4,534,437 | 8/1985 | Howerton . |
| 4,714,125 | 12/1987 | Stacy, Jr. . |
| 4,719,983 | 1/1988 | Bruzzone . |
| 4,823,903 | 4/1989 | Bibollet . |
| 4,828,280 * | 5/1989 | Kies ................................... 280/12.14 |
| 5,102,153 * | 4/1992 | Rhode ................................ 280/12.14 |
| 5,203,424 * | 4/1993 | Gogo et al. ........................... 180/190 |
| 5,423,559 * | 6/1995 | Rhode ................................ 280/12.14 |
| 5,474,146 * | 12/1995 | Yoshioka et al. ..................... 180/190 |
| 5,482,302 | 1/1996 | Yu . |
| 5,518,080 | 5/1996 | Pertile . |
| 5,586,614 | 12/1996 | Kouchi et al. . |
| 5,685,553 * | 11/1997 | Wilcox et al. ........................ 280/284 |
| 5,738,361 * | 4/1998 | Landucci ............................ 280/12.14 |
| 5,772,227 * | 6/1998 | Michail ................................ 280/284 |
| 5,863,051 | 1/1999 | Brenter . |
| 5,904,217 | 5/1999 | Yamamoto et al. . |
| 5,947,220 | 9/1999 | Oka et al. . |
| 6,095,275 * | 8/2000 | Shaw .................................... 180/185 |
| 6,112,840 | 9/2000 | Forbes . |

* cited by examiner

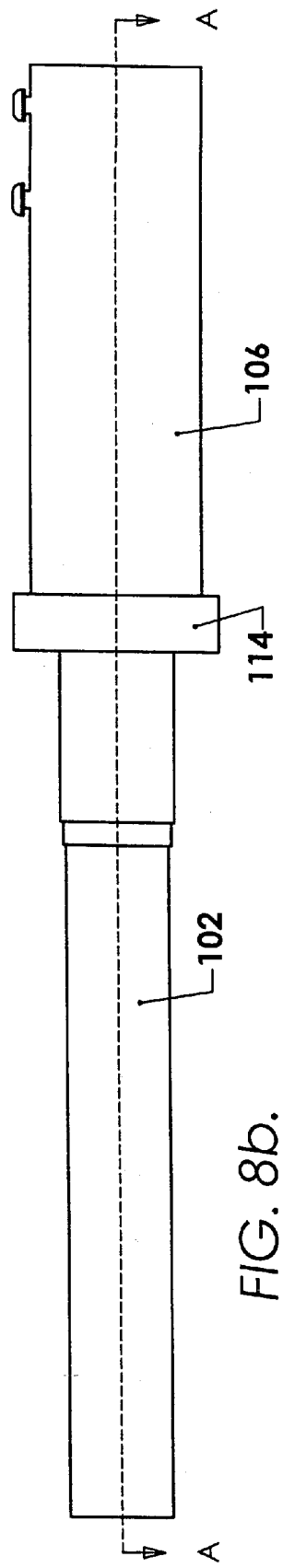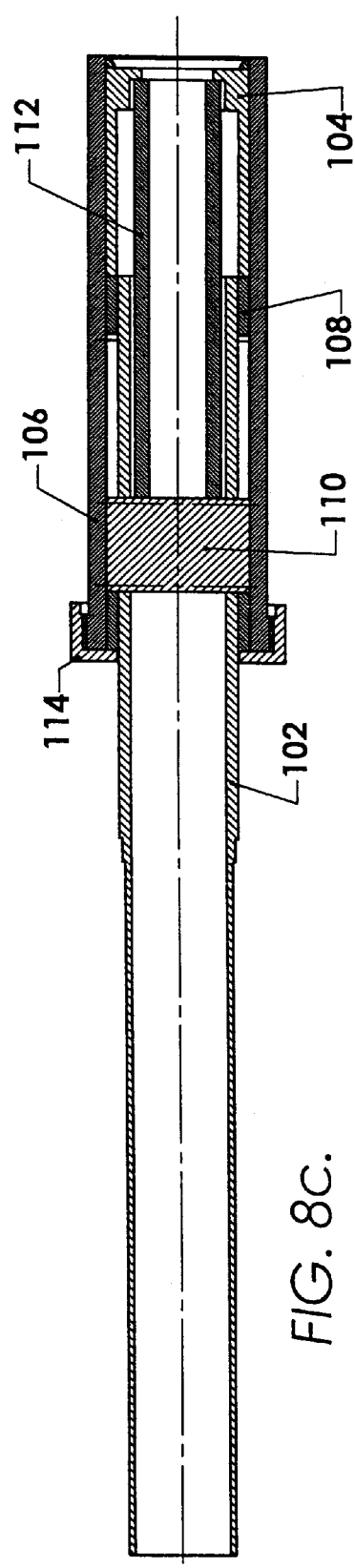
FIG. 8b.
FIG. 8c.

PERSONAL WINTER VEHICLE

RELATED APPLICATIONS

This application is a continuation-in-part application of U.S. patent application Ser. No. 09/255,889 filed Feb. 20, 1999 now abandoned and incorporates by reference all of the teachings thereof.

BACKGROUND OF THE INVENTION

1. Field of the Invention

The invention generally relates to personal winter vehicles, and more specifically to a cycle that may be operated in snow and ice.

2. Description of Related Art

People frequently recreate in cold climates and in snowy conditions. In several types of recreational activities that take place in snowy or icy conditions, the individual rides up a mountain on a mechanical conveyance and then, at the summit of the mountain, slides down the snowy slopes of the mountain. Such activities include skiing, snowboarding, telemarking, and the like. In these types of activities, flat or uphill portions of the mountain reduce one's rate of travel and generally one's enjoyment of the activity. If one stops on a flat or uphill portion of the mountain, building up the momentum to overcome gravity and friction and begin travelling again (and especially to remain travelling) can be an arduous task. Cross-country skis are designed to allow a person to travel on flat portions of land, however they are not ideal for downhill portions of land. Similarly, downhill skis are typically only useful for travelling downhill and are less than desirable for flat portions of land.

People also like to recreate on bicycles. Some individuals have combined typical cold weather activities such as skiing and conventional bicycling in developing a "snow bike." Examples of snow bikes are found in U.S. Pat. No. 2,633,365 to Cwynar et al., U.S. Pat. No. 3,561,783 to Ellett, U.S. Pat. No. 4,027,891 to Frame, and U.S. Pat. No. 4,059,168 to House, the teachings of which are herein incorporated by reference.

The Ellett and Frame devices are essentially bicycle frames with the wheels replaced with short skis. Neither provides any ability for a user to use force to propel the vehicle. The Ellett and Frame devices are limited to use on downhill slopes. Three companies, Brenter, Ludwig, and Vertex, currently market snow bikes of this nature. The user is intended to wear short skis on his or her feet while operating the snow bike for stability.

The Cwynar device is described as a "ski scooter" and is intended to be used by a standing individual. The user keeps one foot on the running board and pushes off the ground with the other foot in a manner similar to propelling a conventional scooter. Instead of wheels, the Cwynar device includes runners, one in the front and two in the rear. The use of one's foot to propel a wheeled scooter on ordinary ground is difficult enough; however, additional problems arise when using such a device on snow or ice. For example, the coefficient of friction between a person's foot and snow/ice is substantially smaller than that between a person's foot and a paved road; one could easily slip when trying to propel the device. Also, on snow that is not uniformly packed down, a person may step into a patch of snow that is deeper and more loosely packed than the person expected, resulting in the person losing his balance and falling from the scooter.

The House device converts a standard bicycle frame by adding skis and a fan on the rear of the frame. The motor-driven fan is intended to create sufficient thrust to propel a person across a snowy field. Because the pedals of the bicycle frame are no longer attached to any resistance-providing structure, a user cannot obtain much exercise benefit from use of this device.

Another device that enables a person to propel a personal vehicle over snow/ice was described in U.S. Pat. No. 551,442 to Korff, the teachings of which are herein incorporated by reference. Korff modified a standard bicycle frame by replacing the front wheel with a guide runner and by adding a rear runner behind it. The rear wheel was left in place and stud plates were placed around the circumference thereof. A user would pedal the device thus causing the rear wheel to turn. Because the wheel was provided with studs for better traction, and because the runners exhibit reduced coefficient of friction, the device would be propelled across snow/ice. However, even with the studs on the wheel, such a device will slip on ice because only a small portion of the wheel tread is in contact with the ice at any given moment. Moreover, no braking mechanism is provided.

All of the above devices suffer from several deficiencies. The Ellett and Frame devices do not allow a user any ability to use force to propel the vehicle. The Cwynar device is difficult to operate and unreliable owing to the non-uniform nature of snow and ice. The House device does not afford an individual any significant exercise. Moreover, much like a conventional snowmobile, the fan required to propel an average weight person is likely to be enormous, heavy, loud, and impractical. Further, none of the above-mentioned devices allow the user to brake or reduce speed in any safe manner. The user must also, in each device listed above, use the respective devices in a single mode only; no provision is made for increasing the mechanical advantage a person has for an inclined surface and/or decreasing the mechanical advantage when riding on downhill slopes. The prior devices also fail to teach a device capable of switching between a motorized or motor-assisted mode of operation and a manual mode. Also, none of the devices mentioned above are suitable for extremely arduous or difficult maneuvering at high speeds, in what is commonly referred to as "extreme sporting" events.

SUMMARY OF THE INVENTION

Accordingly, it is an object of the invention to provide a personal winter vehicle that allow a user the ability to use force to propel the vehicle.

It is another object of the invention to provide a personal winter vehicle that is easy to operate on snow, ice, and other terrain of varying consistencies.

It is another object of the invention to provide a personal winter vehicle that affords the user significant exercise.

It is another object of the invention to provide a personal winter vehicle that enables the user to brake or reduce speed in a safe manner.

It is another object of the invention to provide a personal winter vehicle that allows a user to vary the mechanical advantage depending on personal preference, degree of incline or decline, or the like.

The above and other objects are fulfilled by the invention, which is a personal winter vehicle or snow cycle. The inventive snow cycle includes a frame, having a front portion and a rear portion, and an operator-controlled motivator for generating torque mounted on the frame. The motivator may be a pedal crank and pedals, a motor or engine, or a combination of the two. The snow cycle includes a drive assembly, preferably attached to the rear portion of the frame; the drive assembly is mechanically coupled to and receives torque from the motivator. The drive assembly includes a drive wheel rotatably attached to the rear portion of the frame and coupled to the motivator via mechanical coupling. The drive assembly also preferably includes a guide wheel rotatably attached to the frame and disposed in front of the drive wheel. A track is disposed around at least part of the circumferential rims of the drive and guide wheels engages the drive wheel and the ground. Torque created by the motivator is transmitted to the drive wheel via the mechanical coupling which rotates the drive wheel and moves the track and thereby propels the vehicle. The guide wheel is preferably connected to the rear portion of the frame at a position above ground level. That is, in the normal position of the cycle, the guide wheel does not contact the ground or does not contact the ground at the same level as the rear drive wheel. This configuration raises the leading portion of the track off the ground to allow for better maneuverability in the snow and easier braking.

The mechanical coupling preferably includes a middle gear mechanically interposed between the motivator and the drive wheel. The middle gear is preferably attached to the frame above and rearwardly of the motivator. A first chain belt engages the motivator and the middle gear, and a second chain belt engages the middle gear and the drive wheel. By disposing the middle gear above and forwardly of the drive wheel, gear-shifting structure may be incorporated into the snow cycle. On a conventional bicycle, the gear derailer and sprocket set is disposed next to the rear wheel. However, that design would be impractical on a snow cycle because the derailer would have a tendency to drag in the snow. Thus, the gear derailer has to be placed much higher on the frame of the cycle. One solution would be to use a much larger wheel; however, a bigger wheel dramatically increases the weight of the cycle in the rear of the vehicle. By providing a middle gear between the motivator and the rear drive wheel in the inventive "inverted V" configuration disclosed herein the invention raises the gearing well away from the snow without adding significant amounts of weight to the vehicle.

A shock absorber is preferably connected between the front portion and the rear portion of the frame. The shock absorber is flexible and allows relative movement between the front portion and the rear portion of the frame. When the shock absorber flexes when an operator turns, or brakes, the front and rear portions of the frame flex slightly away from each other, thus causing the guide wheel of the drive assembly to move closer to the ground, thereby placing more of the track in contact with the ground at a given time. This allows for increased traction during braking and turning.

The inventive snow cycle also includes a braking system wholly absent in conventional personal vehicles intended to be used in snow and ice. A brake is attached to the rear portion of the frame and is selectively frictionally engageable with the drive wheel. A brake controller is disposed on the front portion of the frame and is connected to the brake for selectively engaging the brake with the drive wheel to slow rotation of the drive wheel. Moreover, the invention also contemplates a front braking system. The front support preferably includes a ski plate but may further preferably include a front wheel mounted on the front support and contacting the ground. A front brake is preferably attached to the front support and selectively frictionally engageable with the front wheel. A front brake controller is disposed on the front portion of the frame and connected to the front brake for selectively engaging the front brake with the front wheel to slow rotation of the front wheel. By providing both front and rear braking systems, the vehicle is more stable and easier to control and may be stopped over very short distances. Both front and rear brakes may be caliper brakes having hand grip controllers disposed on the steering mechanism and connected to their respective brakes via cables, for example.

As mentioned above, the drive assembly includes a track disposed around the guide wheel and the drive wheel. The track frictionally engages the wheels. One embodiment of the inventive track includes providing a first side of the track with a plurality of knobs and the rims of the guide and drive wheels with a plurality of bosses. The bosses engage the knobs in a synchronous manner; when the drive wheel rotates, the bosses push against the knobs to cause the track to move without slipping with respect to the drive wheel and the guide wheel. Alternatively, the wheels may be provided with recesses into which the knobs on the track fit for the same effect. In the preferred embodiment, however, the inner surface of the track (that which contacts the wheels) may be provided with substantially flat portions which frictionally engage the rims of the wheels. The wheels may be provided with circumferential channels and the inner surface of the track with a raised portion which fits inside the circumferential channels. Side walls of the channels help prevent the track from disengaging the wheels.

In another embodiment, the track is trapezoidal in cross-section, with the wider surface facing outwards and contacting the ground and the smaller surface facing inwards and sitting in a channel in the wheels. The side walls on the wheels in this embodiment are angled to accommodate the angled sides of the trapezoidally-sectioned track.

The track is preferably made of rubber with a core of a flat reinforcing member made of spring steel, nylon, cloth, or a combination thereof. The reinforcing member prevents the track from stretching and enables the track to retain its shape more readily.

BRIEF DESCRIPTION OF THE DRAWINGS

FIG. 8B is a side view of the front shock absorber of FIG. 8A.

FIG. 8C is a side sectional view of the front shock absorber of FIGS. 8A–B.

DETAILED DESCRIPTION OF THE PREFERRED EMBODIMENTS

Figure 1:
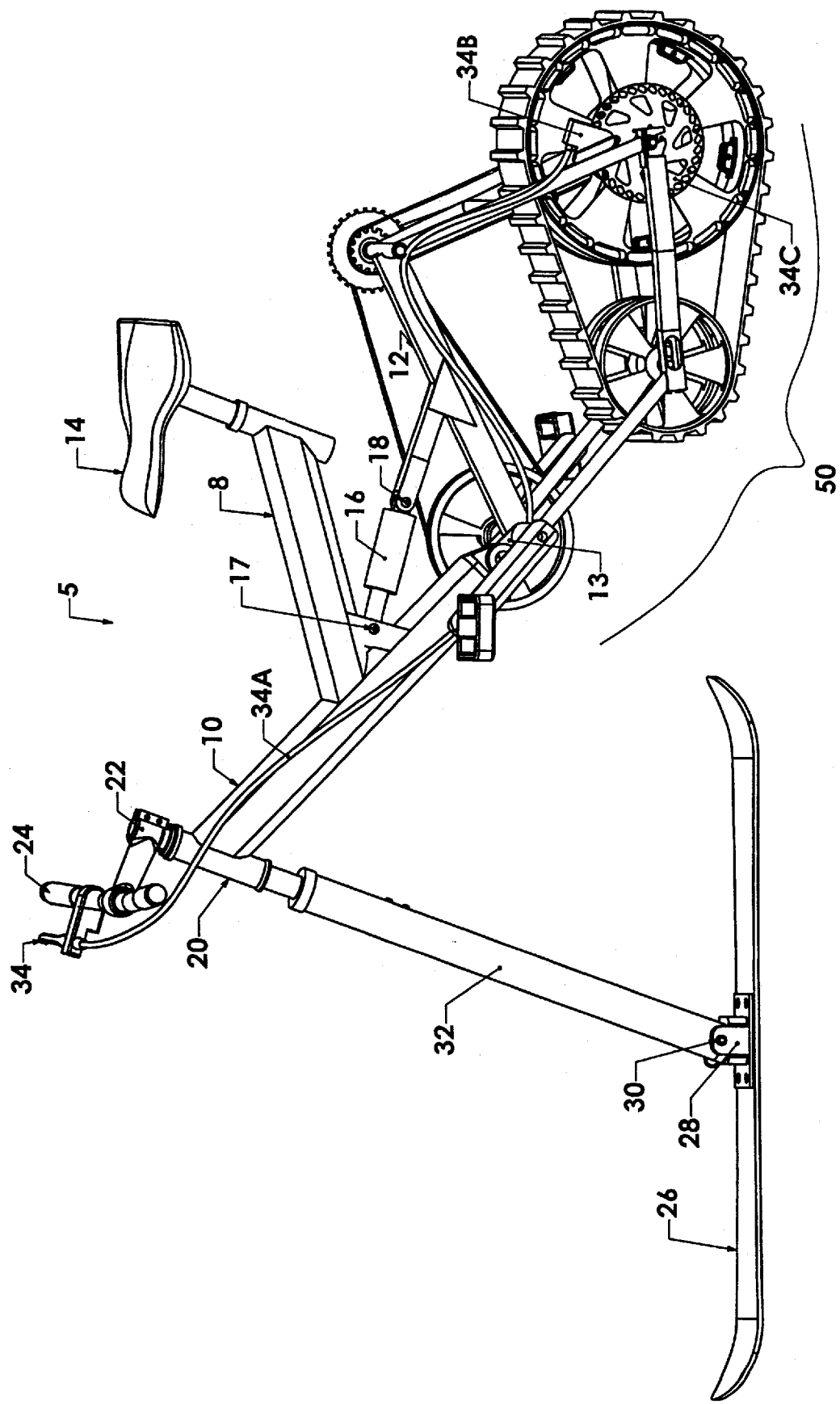
FIG. 1 is a left side perspective view of a snow cycle according to the invention.
Figure 2:
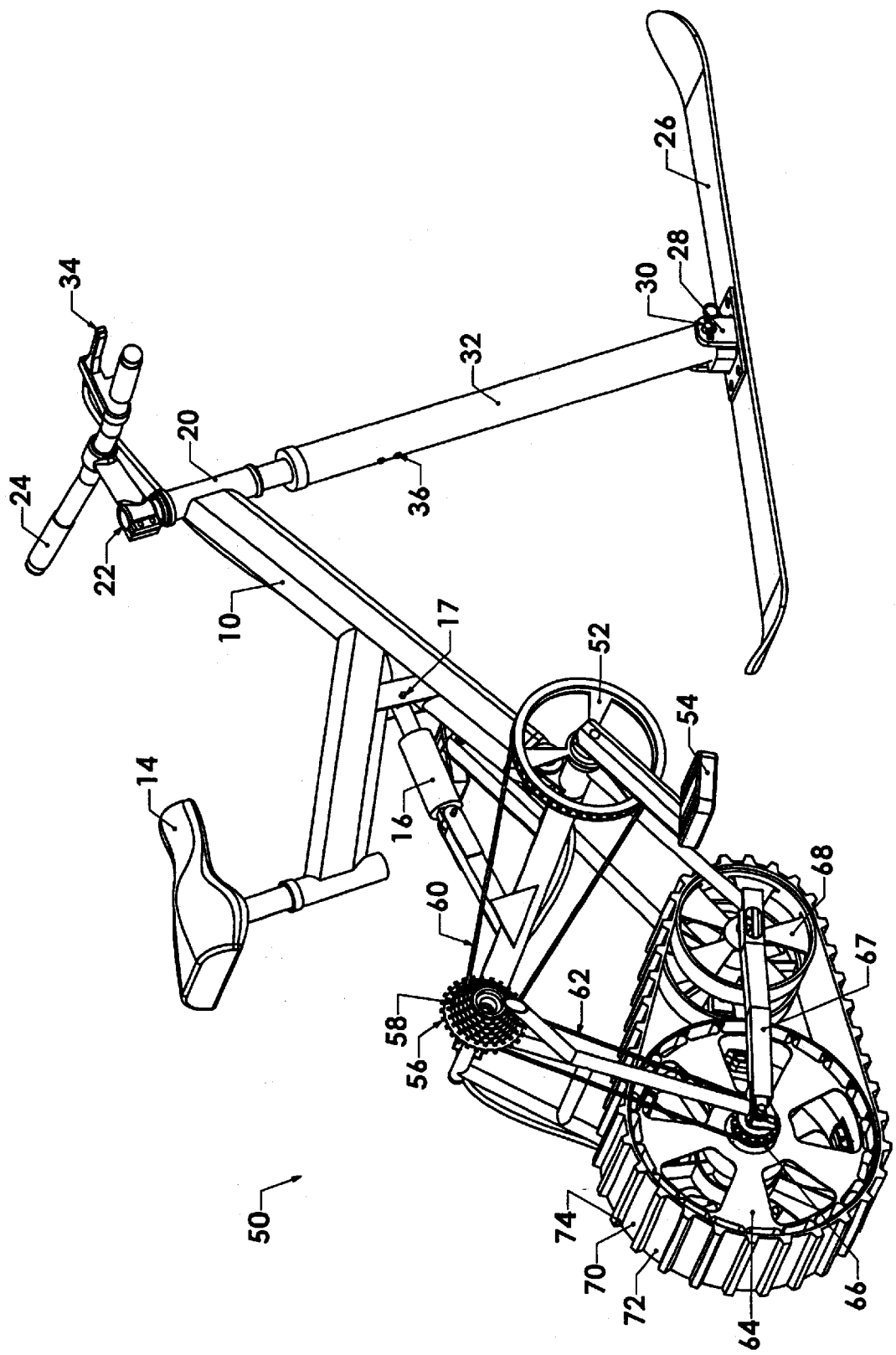
FIG. 2 is a right rear perspective view of the inventive snow cycle of FIG. 1.

Description will now be given of the preferred embodiments with reference to exemplary FIGS. 1–9 attached hereto. Referring to FIGS. 1 and 2, the inventive snow cycle 5 includes a frame 8 having a front frame portion 10 and a rear frame portion 12. Frame 8 may be constructed of tubular steel, aluminum, graphite, or any other lightweight suitable material. Front and rear frames 10 and 12 are connected together at several points in a way to allow for flexure of frame 8 and minor relative movement between front and rear frames 10 and 12. The lowermost portion of front frame 10 is connected to the forwardmost portion of rear frame 12 at point 13 near the pedal crank. Seat 14 is attached to front frame 10. A central shock absorber 16 is mechanically coupled between front frame 10 and rear frame 12. Shock absorber 16 is hingedly or pivotally attached to front frame 10 by pin or rivet 17, and it is hingedly or pivotally attached to rear frame 12 by pin or rivet 18.

The forwardmost end of front frame 10 terminates is a tubular section 20. Steering shaft 22 passes through tube section 20 and is adapted to freely rotate inside tube section 20. Handlebars 24 are attached to the upper portion of steering shaft 22, and a front ski 26 is attached to the lower portion of steering shaft 22. Ski 26 is hingedly attached to the lower end of shaft 22 via mounting plate 28 and pin 30. Mounting plate 28 is secured (e.g., bolted, welded, riveted, etc.) to ski 26 which is, in turn, hingedly secured to the outer cover 32 of the steering column by pin 30. When a user turns handlebars 24, front ski 26 turns with them, thereby enabling the user to steer the vehicle 5. Ski 26 is allowed to pivot around pin 30 to accommodate variations in terrain. At least one handbrake 34 is provided on handlebars 24 to enable the user to slow the rate at which the vehicle is travelling. In one embodiment, brake 34 is a caliper brake connected to the drive system 50 via a cable, a hydraulic-assisted cable, or a fully hydraulic hose (34A), all of which are known in the ordinary bicycle arts but not in the snow/ice vehicle arts. Squeezing handle 34 closes the caliper 34B around disc 34C of one of the wheels to retard the velocity of the wheel and thus slow the vehicle. Instead of a ski plate as shown, the front of the snow cycle may be supported by a wheel (not shown). If a wheel is provided for the front of the device, the handlebars would preferably be provided with a second caliper brake (not shown) which would be connected via a cable, etc. to calipers surrounding the front wheel in the manner of a conventional bicycle. A track similar to the one employed in the rear drive system may also be used as a front support. The handlebars would again be provided with a front brake for the front track.

As best illustrated in FIG. 2, drive system 50 preferably includes a pedal crank 52 having pedals 54. A person places his feet on pedals 54 and applies force to the pedals in a conventional alternating manner. A central gearing 56, which includes a number of differently-sized gears 58, is connected to pedal crank 52 via chain belt 60. A gear derailer (not shown) is provided which enables the user to shift chain belt 60 off of one gear 58 and onto another, in the manner of a conventional bicycle. Alternatively, a single gear could be provided in place of the set of gears 58 shown in FIG. 2, similar to a single-geared bicycle. In either case, a second chain belt 62 is connected from central gearing 56 to drive wheel 64. Drive wheel 64 has a toothed plate 66 for receiving chain belt 62. The drive wheel is attached to the rearwardmost portion of rear frame 12. Preferably disposed in front of drive wheel 64 is a leading guide wheel 68 also mounted on rear frame 12. Surrounding drive and guide wheels 64 and 68 is a track 70 having a tread side 72 which possesses ribs 74. The specifics of drive and guide wheels 64 and 68 and track 70 will be discussed below. When a person pedals the snow cycle, pedal crank 52 is turned, chain 60 transmits the torque to central gearing 56 (which also turns), chain 62 transmits the torque to drive wheel 64, and track 70 is rotated to thereby propel the vehicle.

The drive train 50 preferably takes on the "inverted V" shape as depicted in the figures, with the drive wheel 64 and pedal crank 52 being the end points of the "V" and the central gearing 56 being the vertex of the "V." This configuration is particularly advantageous in the snow cycle. As described above, a conventional bicycle includes a gear derailer and sprocket set right next to the rear wheel. However, that design would limit the usefulness of a snow cycle. If the user were to drive through deep powdery snow, especially snow that is higher than the center of the drive wheel 64, the derailer and gearing would drag in the snow. Having the derailer dragged through the snow would slow the cycle down measurably. Also, if any mud, snow, or ice got stuck in the gears, the chains could spontaneously disengage or the gearing could lock up and get stuck. Thus, the gear derailer has to be placed much higher on the frame of the cycle. One alternative solution would be to use a much larger wheel; however, a bigger wheel dramatically increases the weight of the cycle in the rear of the vehicle. Also, the wheel would have to be so much substantially larger than the preferred drive wheel that it would raise the height of the whole device and the center of gravity of the device. By providing a middle gear between the pedal crank 52 and the rear drive wheel 64 in the inventive "inverted V" configuration, the invention raises the gearing well away from the snow without adding significant amounts of weight to the vehicle and without raising the center of gravity or the height of the vehicle.

Figure 3:
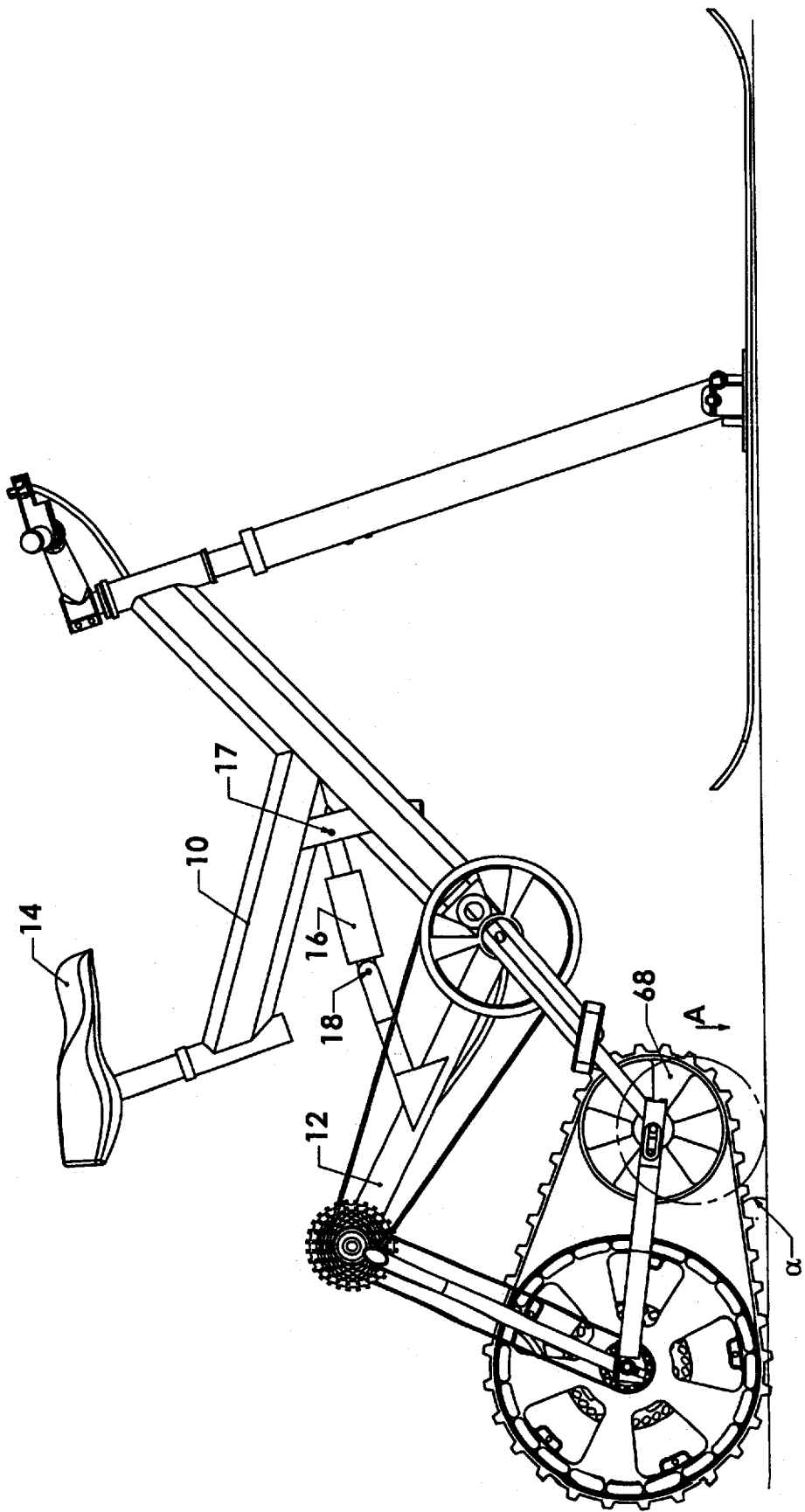
FIG. 3 is a schematic of the inventive snow cycle depicting flexure of the frame.

As shown in the figures, particularly FIG. 3, guide wheel 68 is smaller than drive wheel 64 and is preferably positioned off of ground level, as shown in FIG. 3. The centers of drive wheel 66 and guide wheel 68 are preferably connected with a pair of struts 67. Because of the relative positions and sizes of the two wheels, struts 67 are angled slightly downwards (see FIG. 3, for example) in a rear-to-forward direction with respect to the ground. By positioning guide wheel 68 off of the ground when the cycle is in it's resting state, track 70 is raised off of the ground and is angled upwards with respect to the ground in a rear-forward direction, as shown by angle α in FIG. 3. Raising track 70 off of the ground causes a snowplow effect; when the vehicle is moving, snow and ice tend to build up slightly at the vertex of the angle where the track meets the ground. This snowplow effect assists the user in braking maneuvers. Raising the leading edge of track 70 up off the ground helps prevent the track from getting stuck on any outcroppings in the ground. It is also contemplated as being within the scope of the invention to configure guide wheel 68 as resting on the ground; that is, it is optional but not required to angle track 70 upwards.

As discussed above, front frame 10 and rear frame 12 are hingedly connected together in such a manner as to allow the frame 8 to flex and front and rear frames 10 and 12 to move slightly apart. This flexure causes guide wheel 68 to move lower to the ground, as shown in FIG. 3. The more the frames flex, the lower the guide wheel moves, and the greater the amount of track 70 is in contact with the ground. When the user sits on seat 14, his weight causes the frame to flex and thus causes the guide wheel to move lower towards the ground. Most other high stress activities on the cycle, e.g., braking, turning, accelerating, etc., cause the frames 10 and 12 to flex and guide wheel 68 to be lowered. The greater the amount of track 70 is in contact with the ground, the greater the amount of traction is afforded to the device, and the greater the amount of stability is provided. Hence, as a person rides the cycle 5 harder or more vigorously, the cycle compensates to increase stability and traction.

Figure 4:
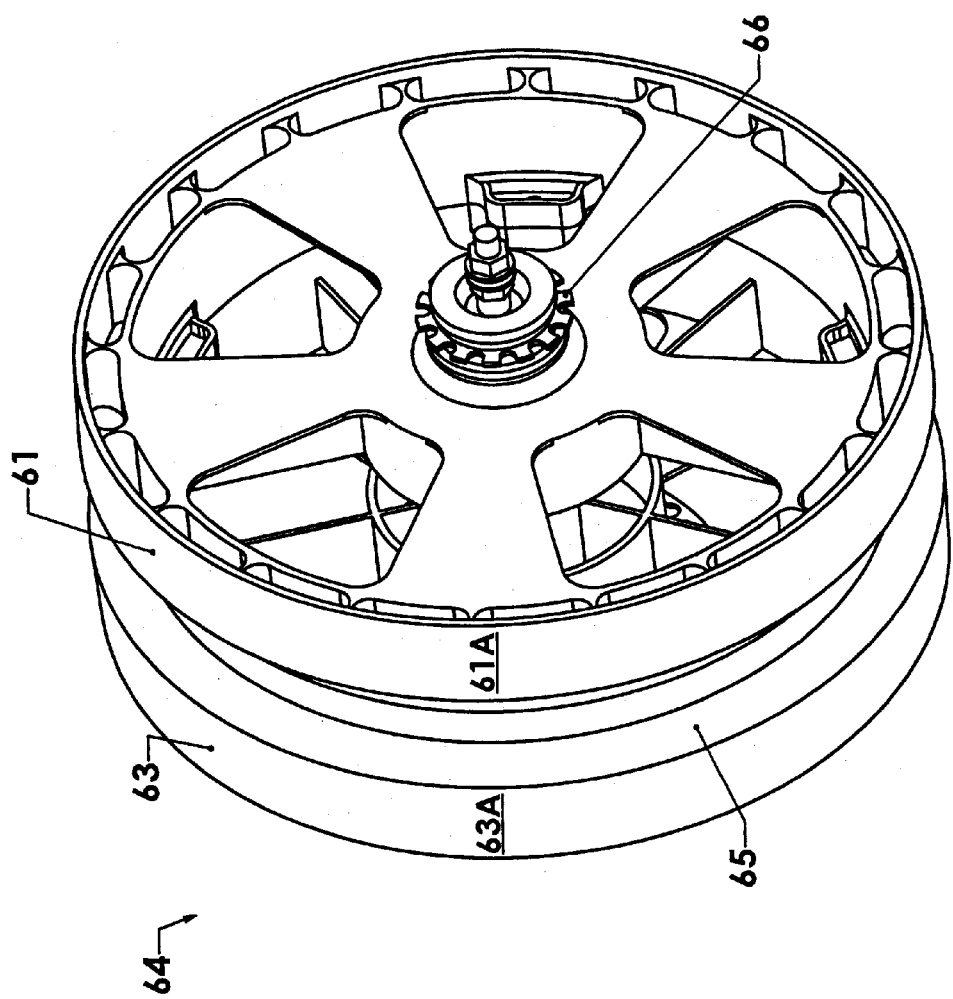
FIG. 4 is a perspective view of the drive wheel of the invention.
Figure 5:
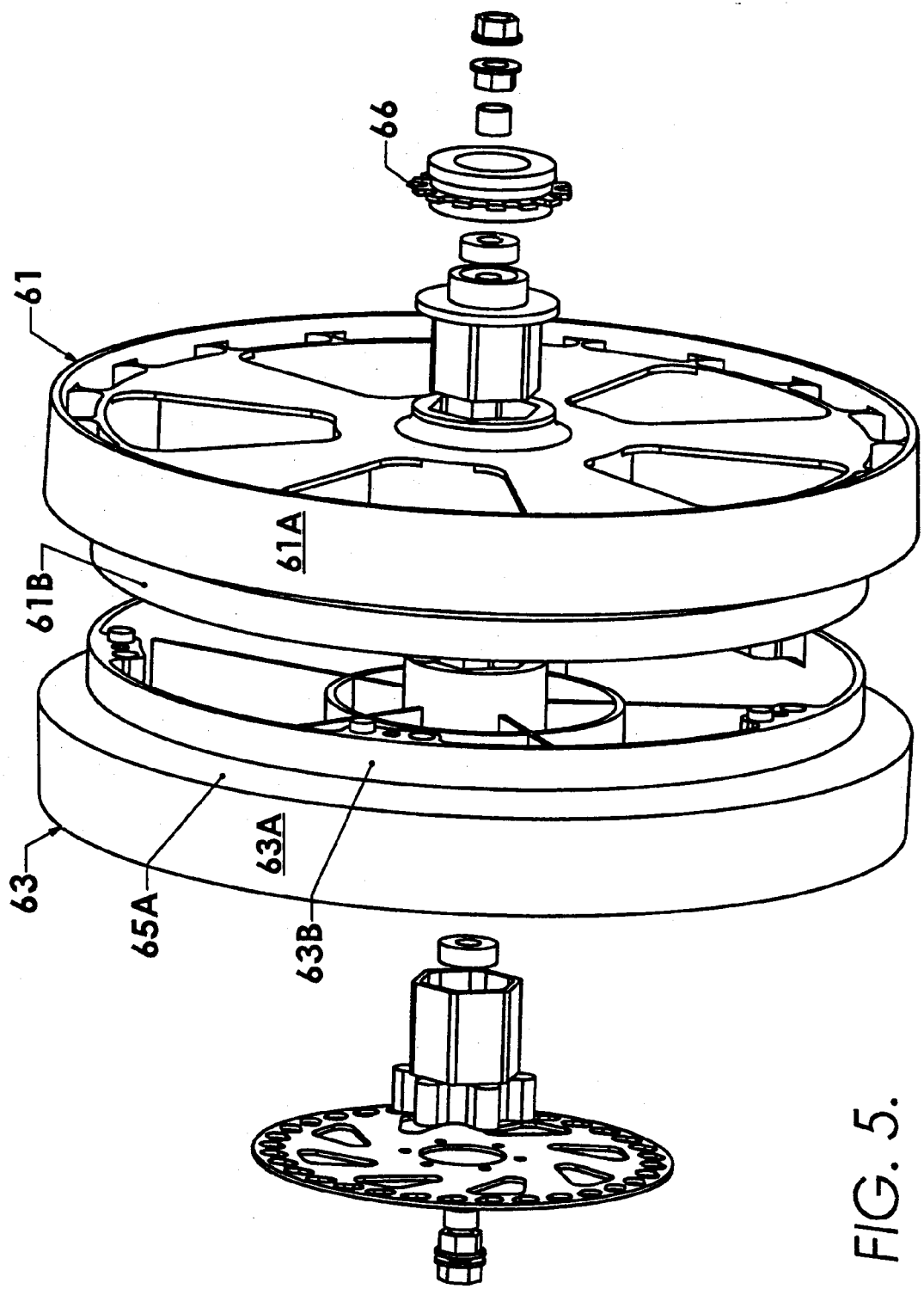
FIG. 5 is an exploded perspective views of the components of the drive wheel of the invention.

The track and wheel system can be off-the-shelf items, however a preferred design is described here. As shown in FIGS. 4–5, drive wheel 64 is made up of two wheel sections 61 and 63 which are connected together at connections 69. The sections 61 and 63 are each provided with circumferential rims 61A and 63A, respectively. When sections 61 and 63 are connected together, rims 61A and 63A do not meet but rather form a channel 65 therebetween. Wheel section 61 includes an inwardly projecting circumferential flange 61B, and wheel section 63 includes a similar flange 63B which forms the floor or bottom surface of channel 65. The respective vertical surfaces between flange 61B and rim 61A and flange 63B and rim 63A forms side walls 65A. The purpose of channel 65, flanges 61B and 63B, and side walls 65A will be explained below. While the description given here is for the drive wheel 64, it may also apply to guide wheel 68.

Figure 6:
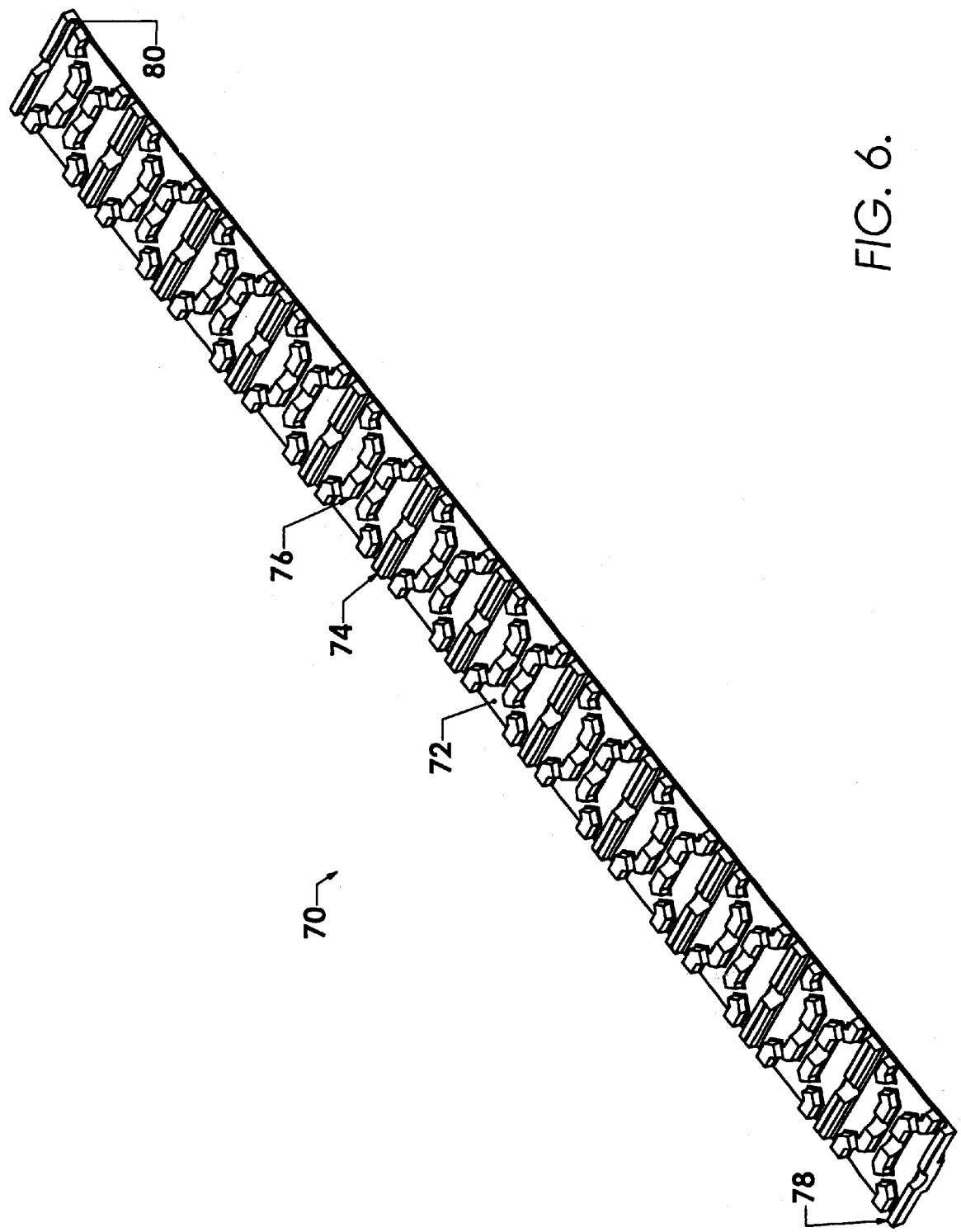
FIG. 6 is a top perspective view of the track of the invention.
Figure 7A:
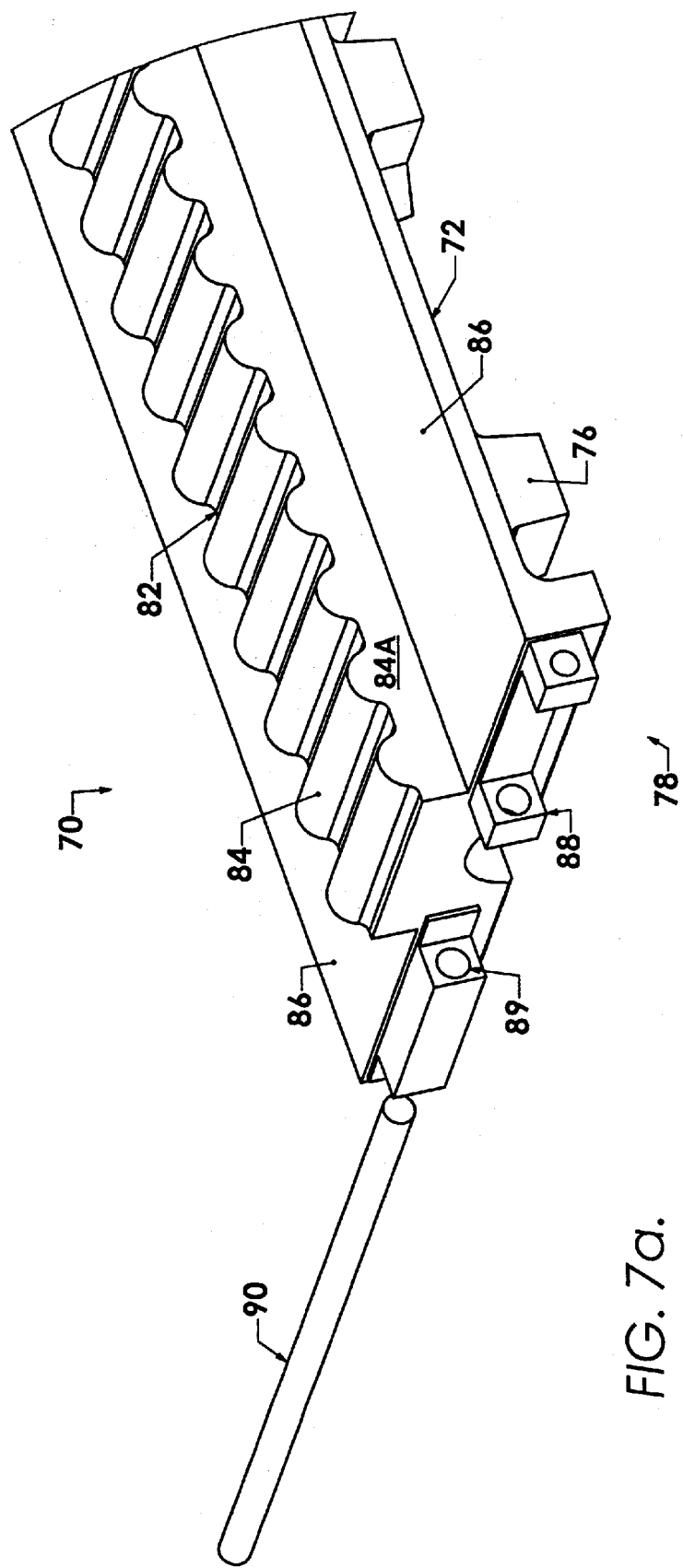
FIG. 7A is a magnified view of an end of the track of FIG. 6.
Figure 7B:
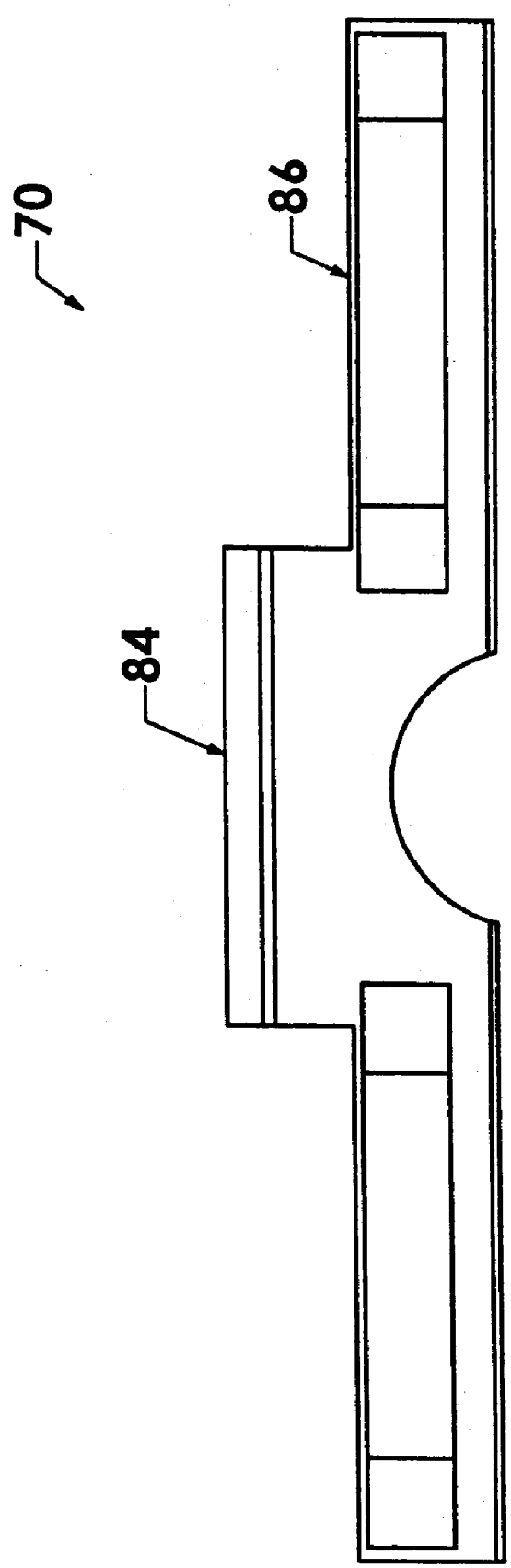
FIG. 7B is a longitudinal schematic view of the profile of the track of FIG. 7A.
Figure 7C:
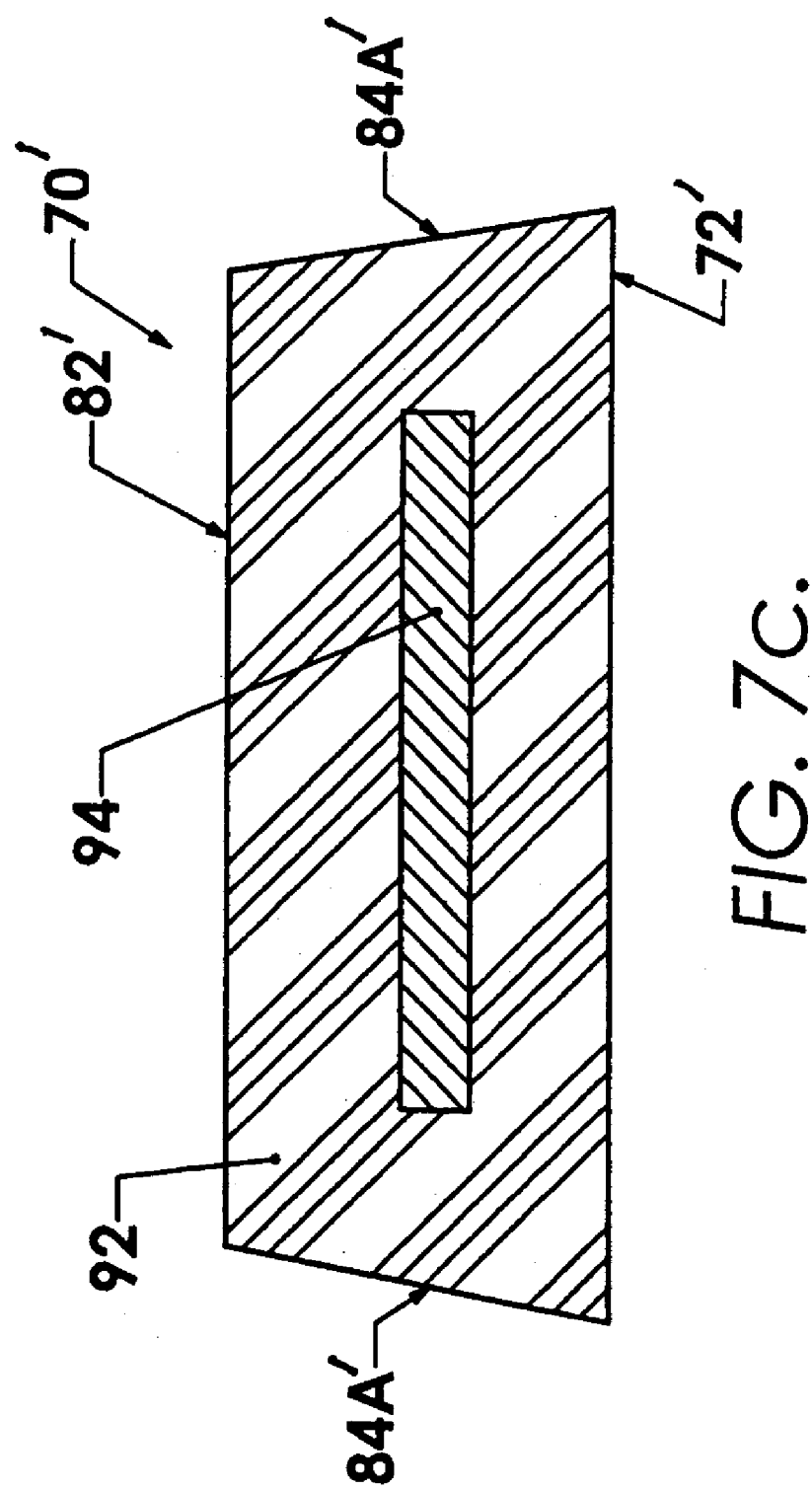
FIG. 7C is a sectional view of a different embodiment of the track of the invention.

The inventive track 70 is depicted in FIGS. 6–7C. The surface that contacts the ground is tread 72 which is preferably made of rubber. Tread 72 includes raised portions 74, 76 which grip snow and ice and provide for increased traction when the vehicle is operating. Raised portions 74, 76 can be formed integrally from the same rubber as tread 72, or they may be added as separate pieces. As shown in FIG. 6, track 70 is not made as a circle or an oval but rather as a flat belt having ends 78, 80. FIG. 7A depicts a close-up of one of the ends of the track and, along with FIG. 7B, illustrates the total structure of the track 70. The "top" side of track 70 which contacts the ground includes tread 72 as discussed above. The reverse or "bottom" side 82 of track 70—the side that faces wheels 64 and 68—preferably includes a central raised section having protuberances 84 and flat side landings 86.

The track is preferably made of rubber with a flat reinforcing member disposed within the rubber; the rubber is molded around the reinforcing member. The reinforcing member may be a sheet of spring steel, a band of nylon (either as a solid flat piece or in the form of a mesh), or a band/mesh of cloth. Preferably, the drive and guide wheels are made of nylon. When track 70 is disposed around the drive wheel 64 and the guide wheel 68, protuberances 84 fit inside channel 65 of drive wheel 64, and side landings 86 sit on top of circumferential rims 61A and 63A. Because track 70 is made of rubber and the wheels 64, 68 are made of nylon, there is excellent frictional engagement between the track and the wheels; the track will not slip or slide over the wheels. Track 70 frictionally engages the wheels in a number of locations: sides 84A engage side walls 65A of wheel 64, the tops of protuberances 84 engage flange 63B, and flat landings 86 engage circumferential rims 61A and 63A. The profile of the inventive track is shown in a head-on broken view in FIG. 7B.

In another embodiment, the track may be formed as shown in section in FIG. 7C. Track 70' is trapezoidal in cross-section; the smaller width side 82' fits inside channels 65 of the wheels, and the wider side 72' forms the tread. The protuberances 74, 76 of the tread of FIG. 6 are intended to project from surface 72' as well. To accommodate the angled side walls 84A' of track 70', the side walls 65A of wheels 64, 68 are also angled accordingly. Track 70' is made of rubber 92 which is molded around a flat reinforcing member 94 (track 70 may also be formed in this fashion, i.e., with rubber molded around a reinforcing member). Reinforcing member 94 helps track 70' retain its shape and prevents the track from stretching.

In an alternative embodiment, the bottom side 82 of the track 70 may include a plurality of knobs (similar to those shown as reference numeral 84) and the wheels 64, 68 are not provided with a central circumferential channel but rather a series of bosses (protuberances, not shown). The bosses engage the knobs in a synchronous manner like gear teeth. When the drive wheel rotates, the bosses push against the knobs to cause the track to move without slipping with respect to the drive wheel and the guide wheel. As another alternative, recesses in the circumferences of the wheels may be provided instead of projecting bosses; in that embodiment, the knobs of the track engage the recesses for the same effect.

The ends 78, 80 of track 70 are matingly engageable to form a loop when engaged. As shown in FIG. 7A, at each end of track 70 are provided flanges 88 which extend out from the ends of the track along the longitudinal axis of the track. Flanges 88 are preferably nestled within and surrounded by the rubber of the track. The flanges are preferably provided with through holes 89 through which a locking pin 90 may be fitted. When the ends 78, 80 of track 70 are mated together, their respective flanges 88 are interleaved and locking pin 90 is passed through all of the through holes 89 of the flanges, thereby locking the ends of the track together in mated engagement. By recessing the flanges so that they are at least partially surrounded by rubber, when the ends of the track are locked to form a closed loop, the surface that contacts the ground is of substantially seamless rubber with no gaps.

Figure 8A:
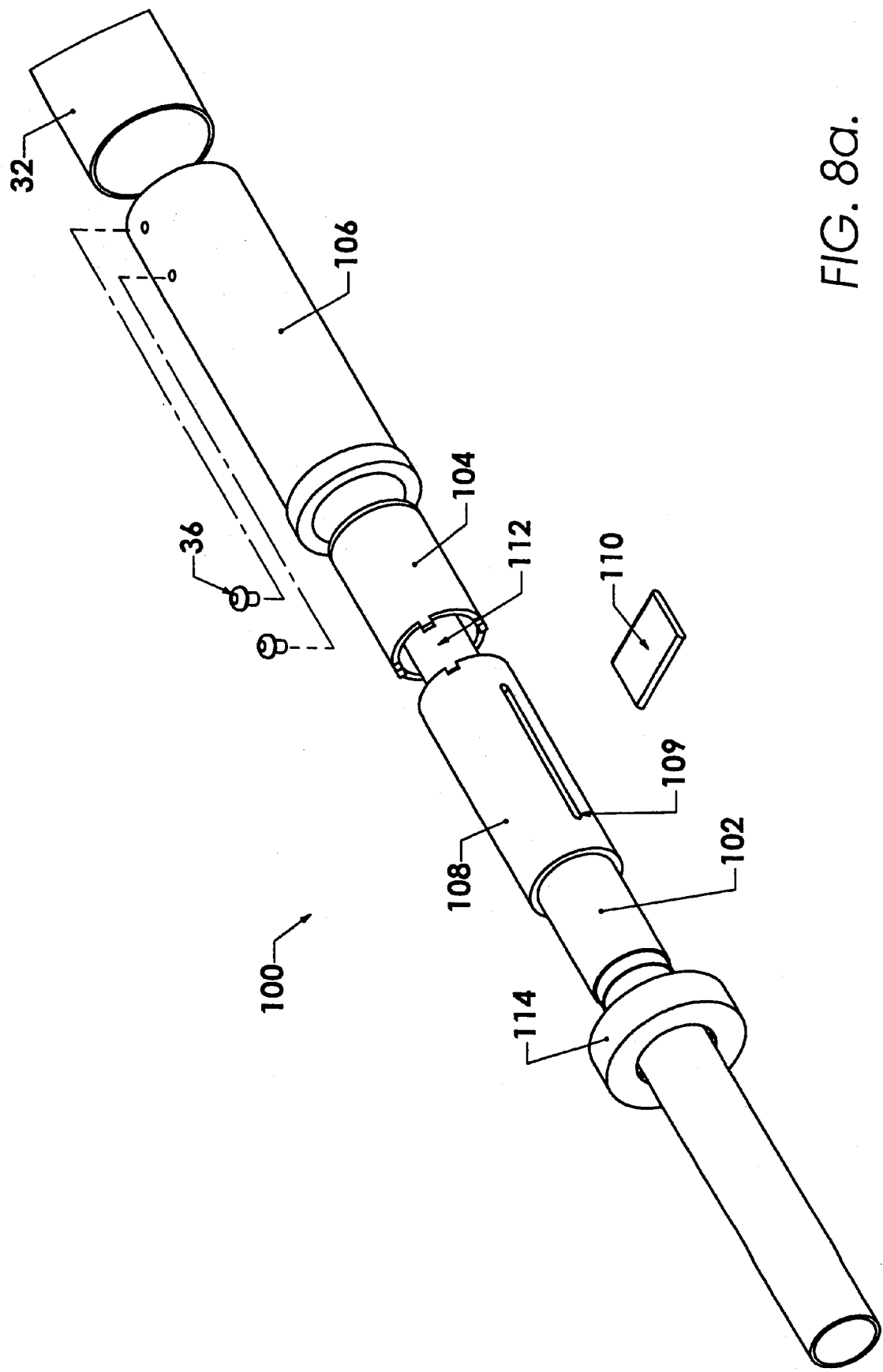
FIG. 8A is an exploded perspective view of the front shock absorber according to the invention.

The front support of the snow cycle is provided with a shock absorber internal to outer cover 32 of FIG. 1. FIGS. 8A–C depict the structure of the shock absorber 100 in accordance with the invention. As shown in all of these figures, the left side of the drawing is the end closest to the handlebars 22, and the right side of the drawing is the end closest to the ski 26. Main shaft 102 is disposed within inner plug 104 which, in turn, is disposed within casing 106. Plug 104 is preferably welded to the bottom interior of casing 106, as shown in FIG. 8C; numerals 109 reference the welds. Between the bottom of main shaft 102 and the interior of plug 104 is a spring 112 which provides the shock absorbing quality of the configuration. A brass bushing 108 is provided fixedly connected to plug 104 and disposed around main shaft 102. Main shaft has a slot (not shown) into which key 110 is press fit, substantially radially through main shaft 102. Bushing 108 also has a slot 109 which can accommodate key 110. Slot 109 is dimensioned to allow key 110 to move freely back and forth along slot 110 but does not allow main shaft 102 to rotate longitudinally with respect to casing 106. That is, because bushing 108 is fixedly secured to plug 104, which is fixedly secured to casing 106, main shaft 102 may only move in a reciprocating fashion along its axis within the range of movement allowed by key 110 within slot 109. Screw cap 114 screws around the top of casing 106 and keeps all of the parts together. Casing 106 is locked into outer cover 32 by locking screws 36. By providing this structure, shock absorber 100 may easily be removed from the cycle 5 if it needs to be replaced.

Figure 9:
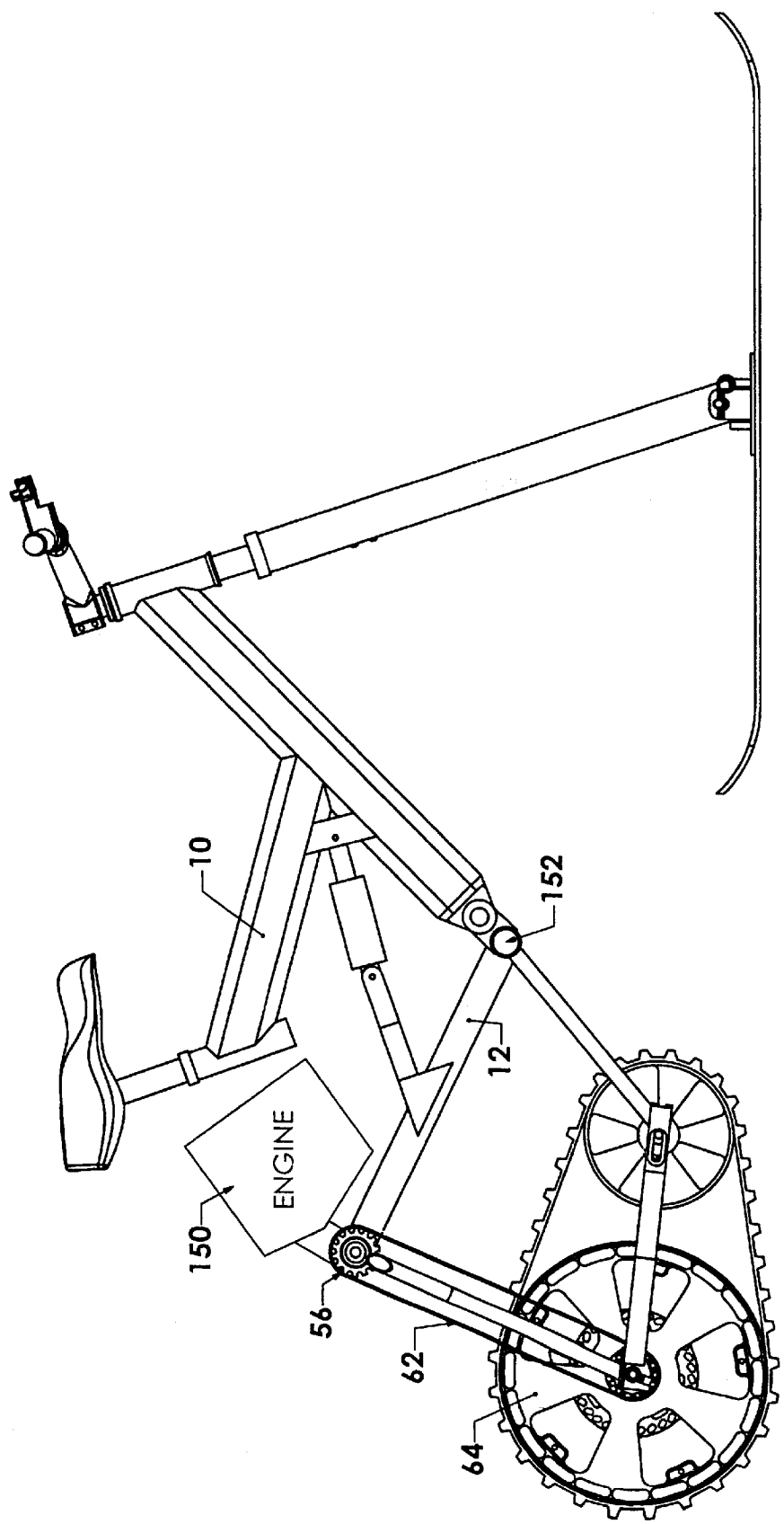
FIG. 9 is a side schematic of a motor-assisted embodiment of the inventive snow cycle.

The above description has been for a snow cycle that is operated manually. However, the device may be motorized as well. As depicted schematically in FIG. 9, an engine 150 is represented in block form. Engine 150 is mechanically coupled to central gearing 56 and provides the torque needed to turn drive wheel 64. For this motorized embodiment, pedals may optionally be deleted and replaced with foot pegs 152 upon which the user may rest his feet when operating the snow cycle. Alternatively, a hybrid version of the snow cycle that incorporates the pedal crank of FIGS. 1 and 2 as well as the engine of FIG. 9 is also contemplated. U.S. Pat. No. 5,941,332 to Dimick teaches a motorized bicycle which has both pedals and a motor. The motor may be used in tandem with the pedal crank for a motor-assist type of ride. A specific clutch mechanism allows the user to selectively engage and disengage the motor while pedalling. The teachings of this Dimick patent are fully incorporated by reference herein.

The invention is not limited to the above description but rather is defined by the claims appearing hereinbelow. Modifications to the above description that include that which is known in the art are well within the scope of the contemplated invention. For example, the device is described as a snow cycle, however it can be used on ice, mud, dirt, pavement, or any other surface. Also, the drive wheel has been described as being made of nylon, however any suitable material can be used which is light weight and provides a good coefficient of friction with the track. Similarly, the track has been described as being preferably made of rubber, however any material may be used. Also, as discussed above, the central gearing may be eliminated in an embodiment which has only one speed of operation. Further, the precise geometries of the front and rear frames may be modified from what is shown in the figures and still fall within the claims.

What is claimed is:

1. A personal winter vehicle, comprising:
   a frame, having a front portion and a rear portion;
   an operator-controlled motivator for generating torque mounted on said frame; and
   a drive assembly, attached to said rear portion of said frame, said drive assembly mechanically coupled to and receiving torque from said motivator, said drive assembly comprising:
      a drive wheel rotatably attached to said rear portion of said frame and coupled to said motivator via mechanical coupling, said drive wheel having a first circumferential rim;
      a single guide wheel rotatably attached to said frame and having a second circumferential rim, said guide wheel being disposed higher than said drive wheel so that a lowermost point on said guide wheel is above a lowermost point on said drive wheel; and
      a track disposed around at least part of said first and second circumferential rims, said track engaging said drive wheel, said guide wheel, and the ground, substantially all of said track being angled upwards owing to relative positions of said guide wheel and said drive wheel,
   wherein application of torque by said motivator is transmitted to said drive wheel via said mechanical coupling which rotates said drive wheel and moves said track and thereby propels said vehicle.

2. A personal winter vehicle according to claim 1, said motivator comprising a pedal crank and pedals, said pedal crank rotatably mounted on said frame, said pedal crank coupled to said drive wheel via said mechanical coupling, wherein when an operator applies force in an alternating manner to said pedals, said pedal crank rotates and propels said vehicle.

3. A personal winter vehicle according to claim 2, wherein said mechanical coupling comprises a chain belt engaging said pedal crank and said drive wheel.

4. A personal winter vehicle according to claim 2, said mechanical coupling comprising:
   a middle gear attached to said frame above and rearwardly of said pedal crank;
   a first chain belt engaging said motivator and said middle gear; and
   a second chain belt engaging said middle gear and said drive wheel.

5. A personal winter vehicle according to claim 4, wherein said middle gear is attached to said frame above and forwardly of said drive wheel.

6. A personal winter vehicle according to claim 1, wherein said guide wheel is smaller than said drive wheel.

7. A personal winter vehicle comprising:
   a frame, having a front portion and a rear portion;
   a motivator for generating torque motivated on said frame;
   a drive assembly, attached to said rear portion of said frame, said drive assembly mechanically coupled to and receiving torque from said motivator, said drive assembly comprising:
      a drive wheel rotatably attached to said rear portion of said frame and coupled to said motivator via mechanical coupling, said drive wheel having a first circumferential rim;
      a guide wheel rotatably attached to said frame and having a second circumferential rim, said guide wheel being disposed higher than said drive wheel so that a lowermost point on said guide wheel is above a lowermost point on said drive wheel; and
      a track disposed around at least part of said first and second circumferential rims, said track engaging said drive wheel, said guide wheel, and the ground, substantially all of said track being angled upwards owing to relative positions of said guide wheel and said drive wheel,
   wherein application of torque by said motivator is transmitted to said drive wheel via said mechanical coupling which rotates said drive wheel and moves said track and thereby propels said vehicle; and
   a shock absorber connected between said front portion and said rear portion of said frame, said shock absorber being flexible and allowing relative movement between said front portion and said rear portion of said frame, wherein when stress is placed on said vehicle, said shock absorber flexes causing said guide wheel of said drive assembly to move downward closer to the ground, thereby placing more of said track in contact with the ground at a given time.

8. A personal winter vehicle according to claim 7, comprising a seat attached to said frame, wherein said shock absorber flexes when an operator sits on said seat, causing said guide wheel of said drive assembly to move closer to the ground, thereby placing more of said track in contact with the ground at a given time.

9. A personal winter vehicle according to claim 7, further comprising:
   a support attached to said front portion of said frame opposite said drive assembly, said frame contacting the ground on said support; and
   a steering mechanism turnably attached to said front portion of said frame and mechanically coupled to said support,
   wherein an operator can selectively turn said steering mechanism, and wherein when an operator turns said steering mechanism, said support turns with said steering mechanism.

10. A personal winter vehicle according to claim 9, wherein when an operator is operating said vehicle and turns said vehicle, said shock absorber flexes and causes said guide wheel of said drive assembly to move closer to the ground, thereby placing more of said track in contact with the ground at a given time.

11. A personal winter vehicle according to claim 9, further comprising:
   a brake attached to said rear portion of said frame and selectively frictionally engageable with said drive wheel; and
   a brake controller, disposed on said front portion of said frame and connected to said brake for selectively engaging said brake with said drive wheel to slow rotation of said drive wheel.

12. A personal winter vehicle according to claim 11, wherein said brake comprises a caliper brake and said brake controller comprises a hand grip disposed on said steering mechanism and connected to said brake via at least one of a cable, a hydraulically-assisted cable, and a fully hydraulic hose.

13. A personal winter vehicle according to claim 11, wherein when an operator is operating said vehicle and engages said brake with said drive wheel, said shock absorber flexes and causes said guide wheel of said drive assembly to move closer to the ground, thereby placing more of said track in contact with the ground at a given time.

14. A personal winter vehicle according to claim 9, wherein said front support comprises a ski plate.

15. A personal winter vehicle according to claim 9, further comprising a front wheel mounted on said front support and contacting the ground.

16. A personal winter vehicle according to claim 15, further comprising:
   a front brake attached to said front support and selectively frictionally engageable with said front wheel; and
   a front brake controller, disposed on said front portion of said frame and connected to said front brake for selectively engaging said front brake with said front wheel to slow rotation of said front wheel.

17. A personal winter vehicle according to claim 16, wherein said front brake comprises a caliper brake and said front brake controller comprises a hand grip disposed on said steering mechanism and connected to said brake via at least one of a cable, a hydraulically-assisted cable, and a fully hydraulic hose.

18. A personal winter vehicle according to claim 1, wherein said track comprises a first side facing said first and second circumferential rims and a second side facing the ground, said first side of said track comprising a plurality of knobs and said first and second circumferential rims comprise a plurality of bosses, said bosses engaging said knobs in a synchronous manner, wherein when said drive wheel rotates, said bosses push against said knobs to cause said track to move without slipping with respect to said drive wheel and said guide wheel.

19. A personal winter vehicle according to claim 18, said first side of said track comprising a plurality of knobs and said first and second circumferential rims comprise a plurality of recesses, said knobs engaging said recesses in a synchronous manner, wherein when said drive wheel rotates, walls of said recesses push against said knobs to cause said track to move without slipping with respect to said drive wheel and said guide wheel.

20. A personal winter vehicle according to claim 18, wherein said first side of said track frictionally engages said first and second circumferential rims of said guide and drive wheels.

21. A personal winter vehicle according to claim 20, said track being made of rubber and comprising:
   a substantially flat frictional surface formed on said first side of said track and adapted to frictionally engage said first and second circumferential rims of said guide and drive wheels; and
   a tread on said second side of said track.

22. A personal winter vehicle according to claim 21, further comprising:
   a first circumferential channel formed in said drive wheel;
   a second circumferential channel formed in said guide wheel; and
   a raised central section formed on said first side of said track,
   wherein said raised central section of said track is disposable within said first and second circumferential channels.

23. A personal winter vehicle according to claim 18, wherein said track is made of rubber and said drive wheel is made of nylon.

24. A personal winter vehicle according to claim 1, said track having a first end and a second end linked together in a loop around said guide wheel and said drive wheel.

25. A personal winter vehicle according to claim 1, said drive wheel further comprising first raised walls disposed on either side of said first circumferential rim, said track including a raised portion adapted to fit between said first raised walls, wherein said first raised walls are adapted to prevent said track from slipping off of said first circumferential rim of said drive wheel.

26. A personal winter vehicle according to claim 1, said guide wheel further comprising second raised walls disposed on either side of said second circumferential rim, said track including a raised portion adapted to fit between said second raised walls, wherein said second raised walls are adapted to prevent said track from slipping off of said second circumferential rim of said guide wheel.

27. A personal winter vehicle according to claim 4, said motivator further comprising a motor selectively engageable with said middle gear, said motor selectively providing torque to said middle gear which is transmitted to said drive wheel to propel said vehicle.

28. A personal winter vehicle according to claim 27, further comprising a clutch mechanism connected between said motor and said middle gear to enable said motor to provide torque simultaneously as an operator pedalling said pedals.

29. A personal winter vehicle according to claim 4, further comprising:
   multiple sets of gear teeth disposed on said middle gear;
   a gear derailer disposed on said middle gear adapted to selectively engage one of said first and second chain belts from a desired one of said multiple sets of gear teeth; and
   a gear shifter disposed on said frame for enabling an operator to selectively engage one of said first and second chain belts from a desired one of said multiple sets of gear teeth and thereby shift gears while operating said vehicle.

30. A personal winter vehicle according to claim 1, further comprising:
   a brake attached to said rear portion of said frame and selectively frictionally engageable with said drive wheel; and
   a brake controller, disposed on said front portion of said frame and connected to said brake for selectively engaging said brake with said drive wheel to slow rotation of said drive wheel.

31. A personal winter vehicle according to claim 1, wherein said track comprises a rubber belt.

32. A personal winter vehicle according to claim 31, wherein said track further comprises a longitudinal reinforcing member disposed within said rubber belt.

33. A personal winter vehicle according to claim 32, wherein said track is substantially trapezoidal in section and said reinforcing member is at least one of a flat sheet of spring steel, a band of nylon, and a band of cloth, and wherein the rubber of said track is formed around said reinforcing member.

34. A personal winter vehicle according to claim 31, wherein said track comprises a flat longitudinal belt having a first end and a second end, wherein said first end and said second end are matingly engageable to form a loop when engaged.

35. A personal winter vehicle according to claim 34, further comprising flanges disposed at said first and second ends of said track, said flanges having through holes formed therethrough, and a locking pin adapted to pass through said through holes and lock said first and second ends together in mating engagement, said flanges on said first end interleaving with said flanges on said second end when said first and second ends are engaged.

36. A personal winter vehicle according to claim 9, further comprising a second shock absorber connected between said steering mechanism and said front support.

37. A personal winter vehicle according to claim 36, wherein said second shock absorber comprises:
   a tubular outer casing;
   a tubular bushing secured to an interior of said outer casing, said bushing having a slot formed therethrough;
   a main shaft adapted to pass through said bushing, said main shaft having a projection extending radially therefrom through said slot in said bushing; and
   a spring mechanically connected between said main shaft and said outer casing.

38. A personal winter vehicle according to claim 1, wherein at least one of said drive and guide wheels comprise a circumferential channel and wherein said track fits at least partially inside said circumferential channel.

39. A personal winter vehicle according to claim 38, wherein said track is trapezoidal in cross section and wherein walls of said circumferential channel are angled to accommodate said track.

40. A snow cycle, comprising:
   a frame, having a front portion and a rear portion;
   an operator-controlled motivator for generating torque mounted on said frame; and
   a drive assembly, attached to said rear portion of said frame, said drive assembly mechanically coupled to and receiving torque from said motivator, said drive assembly comprising:
      a drive wheel rotatably attached to said rear portion of said frame and coupled to said motivator via mechanical coupling, said drive wheel having a circumferential rim;
      a single track guide attached to said rear portion of said frame and disposed in front of said drive wheel, said ouide wheel being disposed higher than said drive wheel;
      a track disposed around at least part of said circumferential rim, said track engaging said drive wheel, said guide wheel, and the ground, substantially all of said track being angled upwards owing to relative positions of said guide wheel and said drive wheel,
   wherein application of torque by said motivator is transmitted to said drive wheel via said mechanical coupling which rotates said drive wheel and moves said track and thereby propels said vehicle.

41. A snow cycle according to claim 40, said motivator comprising a pedal crank and pedals, said pedal crank rotatably mounted on said frame, said pedal crank coupled to said drive wheel via said mechanical coupling, wherein when an operator applies force in an alternating manner to said pedals, said pedal crank rotates and propels said vehicle.

42. A snow cycle according to claim 40, further comprising a shock absorber connected between said front portion and said rear portion of said frame, said shock absorber being flexible and allowing relative movement between said front portion and said rear portion of said frame.

43. A snow cycle according to claim 42, further comprising:
   a support attached to said front portion of said frame opposite said drive assembly, said frame contacting the ground on said support; and
   a steering mechanism turnably attached to said front portion of said frame and mechanically coupled to said support,
   wherein an operator can selectively turn said steering mechanism, and wherein when an operator turns said steering mechanism, said support turns with said steering mechanism.

44. A snow cycle according to claim 43, further comprising:
   a brake attached to said rear portion of said frame and selectively frictionally engageable with said drive wheel; and
   a brake controller, disposed on said front portion of said frame and connected to said brake for selectively engaging said brake with said drive wheel to slow rotation of said drive wheel.

45. A snow cycle according to claim 43, wherein said front support comprises a ski plate.

46. A snow cycle according to claim 40, wherein said track comprises a first side facing said circumferential rim and a second side facing the ground, and wherein said first side of said track frictionally engages said circumferential rim of said drive wheel.

47. A snow cycle according to claim 46, said track being made of rubber and comprising:
   a substantially flat frictional surface formed on said first side of said track and adapted to frictionally engage said circumferential rim of said drive wheel; and
   a tread on said second side of said track.

48. A snow cycle according to claim 47, further comprising:
   a circumferential channel formed in said drive wheel; and
   a raised central section formed on said first side of said track,
   wherein said raised central section of said track is disposable within said circumferential channel.

49. A snow cycle according to claim 40, said track comprising:
   a rubber belt having a substantially trapezoidal cross section; and
   a longitudinal reinforcing member disposed in said rubber belt, said reinforcing member being at least one of a flat sheet of spring steel, a band of nylon, and a band of cloth,
   wherein the rubber of said track is formed around said reinforcing member.

50. A snow cycle according to claim 40, wherein said track guide comprises a single guide wheel and is smaller than said drive wheel.

* * * * *

UNITED STATES PATENT AND TRADEMARK OFFICE
CERTIFICATE OF CORRECTION

PATENT NO. : 6,279,923 B1
DATED : August 28, 2001
INVENTOR(S) : Anthony P. Cardillo, Jr., Jeffrey R. Cardillo and Thomas J. Barresi It is certified that error appears in the above-identified patent and that said Letters Patent is hereby corrected as shown below:

Column 13,
Line 57, delete "ouide wheel" and insert therefor -- track guide --;
Line 61, before "guide" insert -- track --, and delete "wheel";
Line 63, before "guide" insert -- track --, and delete "wheel".

Signed and Sealed this

Twenty-third Day of April, 2002

Attest:

Attesting Officer

JAMES E. ROGAN
Director of the United States Patent and Trademark Office